United States Patent [19]

Mampe et al.

[11] Patent Number: 4,992,649

[45] Date of Patent: Feb. 12, 1991

[54] REMOTE VIDEO SCANNING AUTOMATED SORTING SYSTEM

[75] Inventors: John J. Mampe, Bendersville, Pa.; Oscar L. Avant, Rockville, Md.

[73] Assignee: United States Postal Service, Washington, D.C.

[21] Appl. No.: 251,881

[22] Filed: Sep. 30, 1988

[51] Int. Cl.[5] .......................... G06K 1/12; G06K 7/10
[52] U.S. Cl. .................... 235/462; 235/375; 235/432; 209/900; 209/546
[58] Field of Search ...................... 235/375, 432, 462; 382/1; 364/478; 209/3.3, 583, 584, 900, 546

[56]  References Cited

U.S. PATENT DOCUMENTS

| | | | |
|---|---|---|---|
| 3,587,856 | 6/1971 | Lemelson | 209/3.3 |
| 4,205,780 | 6/1980 | Burns et al. | 235/432 |
| 4,264,808 | 4/1981 | Owens et al. | 235/432 |
| 4,632,252 | 12/1986 | Haruki et al. | 364/478 |
| 4,641,753 | 2/1987 | Tamada | 209/584 |
| 4,778,062 | 10/1988 | Pavie et al. | 382/1 |
| 4,871,903 | 10/1989 | Carrell | 235/375 |

Primary Examiner—Stuart S. Levy
Assistant Examiner—Robert Weinhardt

[57] ABSTRACT

A material handling system which is particularly suitable for sorting mail is disclosed. The system involves tagging each piece or item with an item code linked to the electronic image of the item. After tagging, the items can be stored in trays, containers, or other temporary storage locations. The video image obtained from the items are then processed. In processing mail, the address is converted, e.g., to a destination code. The results of the processing (e.g., the destination code) are stored in an electronic random access memory along with the item code of the piece. The item is then scanned to read the item code, and the destination code is applied to the item.

6 Claims, 1 Drawing Sheet

REMOTE VIDEO SCANNING AUTOMATED SORTING SYSTEM

BACKGROUND OF THE INVENTION

1. Field of the Invention

The present invention relates to a novel material handling system, and more particularly to an improved process for sorting mail.

2. The Prior Art

As is known, mechanized mail processing systems typically use operating keying stations where the mailpiece is physically presented directly to the operator for reading and keying of the address information. These systems are noisy and are often located on the dusty workroom floor. To provide improved operator environments, remotely located video display (RVD) systems have been developed. These systems use mechanical transports with cameras or scanners which are located on the workroom floor to process the actual mailpieces, while the operators are normally located in enclosed adjacent areas. The enclosed areas can be environmentally controlled to improve the operators' working conditions. To provide the time necessary for keying the mailpieces, mechanical delay loops or buffers hold the mailpieces in transit while the video information is being sequentially processed by the operators. Since the delay loops or buffers are mechanical, they are designed for fixed periods of time. The length of the loop is normally dependent upon the maximum number of coding consoles that are configured with the specific system. This loop is used for pipeline processing, which means that the operator must key the address information within the delay period or the mailpiece is rejected. Recirculating loops to permit a mailpiece to go through the delay loop a second time have also been proposed. In any event, if the delay loop fills with mailpieces, the feeder is inhibited in order to stop the introduction of new mailpieces until those within the loop are processed. Thus, the throughput of the system is directly dependent upon the number of operators on the system and the keying rate of each, with an additional loss due to items that cannot be coded within the time queue.

Attempts have also been made to integrate on-line the concept of remote video with optical character recognition. These attempts have generally met with failure. The major problems are the mechanical delay loop, which determines how many items can be queued for processing, and the nonhomogeneous nature of the input mailstream. If, for example, the loop fills with items which cannot be read by an optical character reader (OCR), the feeding mechanism is normally stopped. Thus, if there are not enough operators on duty and a run of OCR unreadable mail is encountered, the system stops feeding when the delay loop fills up. The feeder remains off until the queue goes down to some preset level. If a quantity of OCR readable mail is at the feeder ready for processing, the feeder remains off until the preset level is reached. Thus, overall throughput is reduced. On the other hand, if the system is staffed with a full complement of operators and a run of OCR readable mail is encountered, the operators could remain idle. A possible solution to this problem would be to switch images from a stand-alone video system to the OCR/video system. However, this would affect the loading or throughput of the stand-alone system. Another approach which has been proposed is to multiplex the operator terminals across many machines. This minimizes the problems in larger post offices where many OCRs would be installed, but fails to work as a solution when mail volume is low, such as early in the day when only one or two OCRs are operating. It also fails to work in smaller post offices whose volume can only justify one or two OCRs.

SUMMARY OF THE INVENTION

In summary, the present invention solves the above and further problems associated with mail processing systems by eliminating the use of known physical delay mechanisms. In its broadest aspect, the invention involves tagging each mailpiece or item with an item code linked to an electronic image of the item. As will be explained below, the electronic image may be taken or generated at the time of tagging of the item. In any event, each image is electronically linked to the corresponding item code. After tagging, the items can be stored in trays, containers or other temporary storage locations. The electronic (e.g., video) images obtained from the items are then processed in sequence either electronically or by operators. The results of the processing are stored in an electronic random access memory along with the sequence number of the piece. The items (e.g., the mailpieces) are processed through an item code reading system which is responsively associated with the random access memory, the results are obtained from the random access storage device, and the item is either coded and sorted or simply sorted. The size of the item is not a limitation. The concept is equally applicable to letter-sized mail, flats or magazines, parcels, or any other item that requires sorting or information to be acquired and processed from its surface.

DETAILED DESCRIPTION OF THE PREFERRED EMBODIMENT

Figure 1:
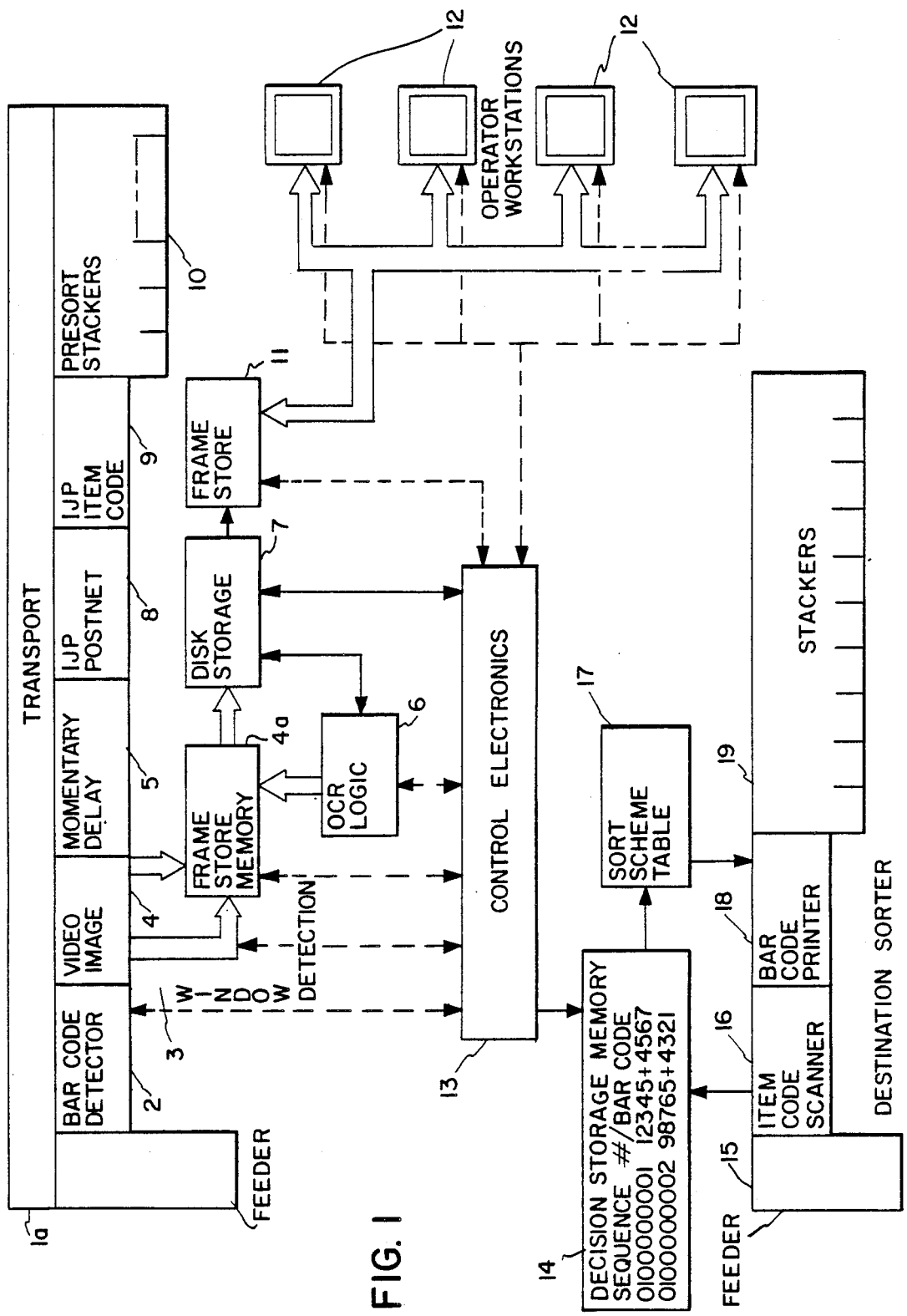
FIG. 1 shows in schematic form the apparatus for video scanning in an automated mail sorting system in accordance with the invention.

As briefly discussed above, the present invention relates to material handling, and more particularly to an improved process for sorting and distributing various items or materials. In the practice of the invention, and speaking broadly for the moment, the unsorted item is scanned and/or photographed (e.g. recorded on videotape or videodisk). An item code is generated and is physically applied to the item. The item itself may then be temporarily stored by techniques suitable to the item. An operator or automated process, either local or remote, retrieves the scanned or photographed image and processes or enters information that associates a distribution or sort code with the item code. The distribution or sort code information is stored in association with the item code. The physical item is later scanned to read the item code. The item code is used to determine the sort code or distribution code that was associated with the item at the time it was processed by the operator. The physical item may then be sorted and/or tagged with a sort and/or distribution code.

Turning now to further details of the invention, and with reference to FIG. 1, the item is singulated and fed down a mechanical transport or feeder 1. The item is then scanned at the bar code detector/scanners 2 to detect an existing code. The item may also be scanned at the window detectors 3, to detect presence of a plastic window covering on an envelope or other information which could later improve OCR recognition, and is then scanned at the high resolution video image scanner 4. The video data are digitized and stored on a temporary basis in an image frame store memory 4a. OCR logic 6 processes the image, and the item is momentarily held in a mechanical delay line 5. At the end of the mechanical delay line, the item is presented to the bar code printer 8. If the OCR logic has determined the destination of the item, the appropriate destination code is sprayed on the item, for example, in the form of a bar code. If the destination cannot be determined, the video information for the item is transferred to long-term disk storage 7 and the item receives an item code 9 at the code printer. However, as stated elsewhere in this disclosure, each item being processed can be given an item code. Depending upon the OCR logic results, the control electronics 13 direct the items to the presort stacker 10 which includes reject stackers for those items for which the OCR could not determine a destination. The control electronics also assigns the unique item code which is stored with the appropriate video information on disk as well as being applied physically to the item. Since the video image of the items has now been stored, items for which the OCR could not determine a destination are processed a second time either by the OCR logic 6 or by video coding operators at coding stations 12. The long-term storage capability afforded by the disk storage 7 makes possible this second OCR pass. Data from the disk 7 pass through a frame store memory 11 which enables slewing the data to minimize disk accesses. The operators' workstations 12 store the individual images of the items that are being processed. Upon determination of the destination (or other sort information) for the item by the OCR logic or operators, the decision is stored in the decision storage memory 14. This table lookup contains the item sequence number and the destination ZIP Code.

Items removed from the presort stackers 10 are sorted in trays or any other suitable container or mail transfer mechanism until they have been processed by the operators. At some point they are presented to the destination sorter for processing. This feeder/transport/stacker system 15 singulates the items and passes each down the transport. While in motion, the item code scanner 16 reads the item code applied on the image capture system. This code is the pointer into the decision storage memory 14 and is used to retrieve the ZIP Code and other sorting information associated with the item.

The ZIP Code information is passed to the destination sorters sort scheme table 17 and the bar code printer 18. The bar code is applied to the item and the item is sorted into one of the stackers 19 according to the sort scheme information retrieved from the sort scheme table 17. If additional sorting passes are required, each is done on a destination sorter according to the destination ZIP Code and a simple look-up in the sort scheme table.

In accordance with the invention, since the items are tagged, the time available for determining the destination or other information from the item being viewed is only dependent upon the video storage capacity provided in the system and the rate at which the images are acquired. This time can range from seconds to hours or even days. Also, load balancing of the human operators' productivity and that of an optical character reader or other machine which processes the video information is optimized. This is not practical with systems that are constrained with in-line mechanical buffers.

The sequence of the items is not important. After the items are scanned and tagged with the item code, the physical items do not need to be kept in any particular order. Thus, if a container of many items is dropped and the items scattered, they can be returned to the container in random order. There is no requirement, as in known systems, for physically constraining an item in order to determine its location at any time. If an operator leaves the work station, the video acquisition system can continue to acquire video data and apply the tagging code to the item. If the video acquisition system fails and requires maintenance, the operators can continue to process the accumulated video images. The video system can be integrated into any existing system that has a singulated stream of items. Thus, the system could be freestanding, or could be added to the OCR, a facer/canceller, or (in the case of parcels) a conveyor belt at the entrance to the building. As the video acquisition system scans the item and stores the data for reasonably long term (minutes, hours, or more), the OCR logic can operate upon the video data after they are stored. Thus, the OCR could operate longer on items that are difficult to read, processing each piece at different video thresholds until a decision is reached. This increases the yield or accept rate.

In postal mail sorting operations, the video acquisition system could be integrated with facer/cancelers, thus eliminating the additional processing step through a stand-alone OCR. In addition, the video acquisition with OCR logic could be added to systems such as flat mail sorters, irregular item sorters, or parcel sorters that currently do not lend themselves to stand-alone OCR systems.

Information on production, productivity, distribution, etc., is readily consolidated. Since each piece is individually tagged, and the tag or sequence number can contain time and date information, accurate data can be obtained for production control and forecasting of downstream operations. Standardization can be accomplished with a few modules. Thus, many differently sized items (letter-sized envelopes, flat mailpieces, parcels) can be processed with the same video storage and multiplexing electronics, the same video coding stations, and possibly the same video scanner (depending upon the resolution required). Only the transport mechanism need be changed. Also, the tagging code could be tailored to the application. For mail processing, the code can contain the identifier of the equipment, postal facility, date or time, plus the sequence number of the piece. If a piece is not processed within a reasonable period of time (for example two hours) the image can be erased, making video storage space available for another piece. The item number will still contain the date, time, and machine on which the item was processed. The structure of the code does not require standardization across differently sized items. For letter mail the U.S. Postal Service's POSTNET bar code could be used. Parcels could utilize the interleaved two of five code. The system could accommodate many different codes on an intermixed basis. Data on processing anomalies would be maintained for improved management of the operation.

The concept would be compatible with coding of mailpieces to the letter carrier stop level, if desired. Different approaches are possible, requiring national multiline directory support and the printing of an eleven-digit expanded ZIP Code. The last two digits would be a number representing the house number, apartment number or other level of data to resolve to the specific carrier stop. Due to the time delay afforded by tagging the item or mailpiece, the operator keying stations could actually be located in a facility geographically remote from the material handling facility.

Items that require physical shipment to another location before or after processing of the video image by an operator, but before the item is processed on the destination coding system, can be dispatched after the items are scanned and the item code is applied. The data file with the item code and the associated destination code can be transmitted electronically at a later time. The destination code would then be applied at the destination location on a destination coding system. In the postal environment, this would mean that presorted mailpieces could be scanned in one post office where an item code would be applied, then the mailpieces could be dispatched to a destination post office while the images are being processed. By the time the mailpieces arrive at the destination post office, the video keying operators could have processed each image and a file could have been created which would contain the item code and an associated nine-digit code or extended eleven-digit code (with addressee information). At the destination post office, the mailpieces would be processed on a sorting machine which reads the item code, applies the nine-digit code (or extended eleven-digit) code, and sorts the mailpieces to the addressee or to the carrier for delivery to the addressee. Thus, dispatches which are tied to existing transportation schedules could be maintained although the mailpieces might not have been sorted to the ultimate addressee level.

The various apparatus employed in the present invention, such as bar code printers, stackers, sorting devices and the like, are known in the art and are disclosed, for example, in U.S. Pat. Nos. 4,641,753, 4,641,347, 4,632,252, 4,615,446, and 4,595,188. While preferred embodiments have been disclosed for illustrative purposes, it should be readily apparent to those skilled in the art that other embodiments can be used within the scope of the invention. The invention, for example, is not limited to the sorting of mail, and can be used for processing other items and for material handling generally.

What is claimed is:

1. An apparatus for use in a mail sorting system comprising
   first scanning means for obtaining video images of successively conveyed mailpieces;
   means responsive to said scanning means for recognizing said video images and for generating destination codes in response thereto;
   means for applying an item code to said mailpieces and for operably linking said item code to the corresponding video image for each mailpiece;
   second scanning means for reading said item code applied to said mailpiece; and
   means operatively associated with and responsive to said recognizing and generating means and second scanning means for applying said destination codes to said mailpieces.

2. The apparatus in accordance with claim 1 and further comprising means for sorting said mailpieces in response to said destination code.

3. The apparatus in accordance with claim 1 wherein said first and second scanning means comprise optical reading devices.

4. The apparatus in accordance with claim 1 wherein said means for applying said destination code to said mailpiece comprises a bar code printer.

5. An apparatus for use in a sorting system comprising
   first scanning means for obtaining video images of successively conveyed items;
   means responsive to said scanning means for recognizing said video images and for generating destination codes in response thereto;
   means for applying an item code to said items and for operably linking said item code to the corresponding video image for each item;
   second scanning means for reading said item code applied to said item; and
   means operatively associated with and responsive to said recognizing and generating means and second scanning means for applying said destination codes to said item.

6. A process for use in sorting items comprising the steps of
   passing an item to be sorted to a scanning means to obtain a video image of said item;
   applying an item code to said item, while causing said item code to be associated with said video image;
   causing said item to be transported to a storage or processing zone;
   processing the information contained in said video image to obtain a distribution or sort code for said item;
   retrieving said item from said storage or processing zone;
   scanning said item to read said item code; and
   applying said distribution or sort code generated from said video image to said item.

* * * * *